United States Patent [19]

Flax et al.

[11] Patent Number: 4,475,396
[45] Date of Patent: Oct. 9, 1984

[54] METHOD OF DETERMINING ULTRASONIC ATTENUATION OF TISSUE USING REFLECTIVE TOMOGRAPHIC RECONSTRUCTION

[75] Inventors: Stephen W. Flax; Gary H. Glover, both of Waukesha, Wis.

[73] Assignee: General Electric Company, Rancho Cordova

[21] Appl. No.: 398,817

[22] Filed: Jul. 16, 1982

[51] Int. Cl.³ .............................................. G01N 29/04
[52] U.S. Cl. .................................................... 73/599
[58] Field of Search ............. 73/1 DV, 631, 599, 627, 73/620, 602, 618; 128/660

[56] References Cited

U.S. PATENT DOCUMENTS

| | | | |
|---|---|---|---|
| 3,309,914 | 3/1967 | Weighart | 73/631 |
| 4,016,750 | 4/1977 | Green | 73/631 |

OTHER PUBLICATIONS

"Ultrasonic Attenuation Tomography of Soft Tissues," Dines et al., *Ultrasonic Imaging*, vol. No. 1, 1979.
"Estimating the Acoustic Attenuation Coefficient Scope for Liver from Reflected Ultrasound Signals", Kuc et al., IEEE Transactions on Sonics and Ultrasonics, vol. SU-26, No. 5, Sep. 1979.
"Statistical Evaluation of the Doppler Ultrasonic Blood Flowmeter", Flax et al, ISA Transactions, vol. 10, No. 1, 1971.

*Primary Examiner*—Anthony V. Ciarlante
*Attorney, Agent, or Firm*—Flehr, Hohbach, Test, Albritton & Herbert

[57] ABSTRACT

Ultrasonic wave attenuation is determined for a plurality of limited volumes of tissue comprising a body under examination by directing ultrasonic waves through each limited volume along a plurality of vectors, determining a measure of attenuation of the limited volume by detecting the frequency shift of reflections of the ultrasonic wave along each vector, and averaging the attenuation of each limited volume from each vector intersecting the limited volume.

3 Claims, 5 Drawing Figures

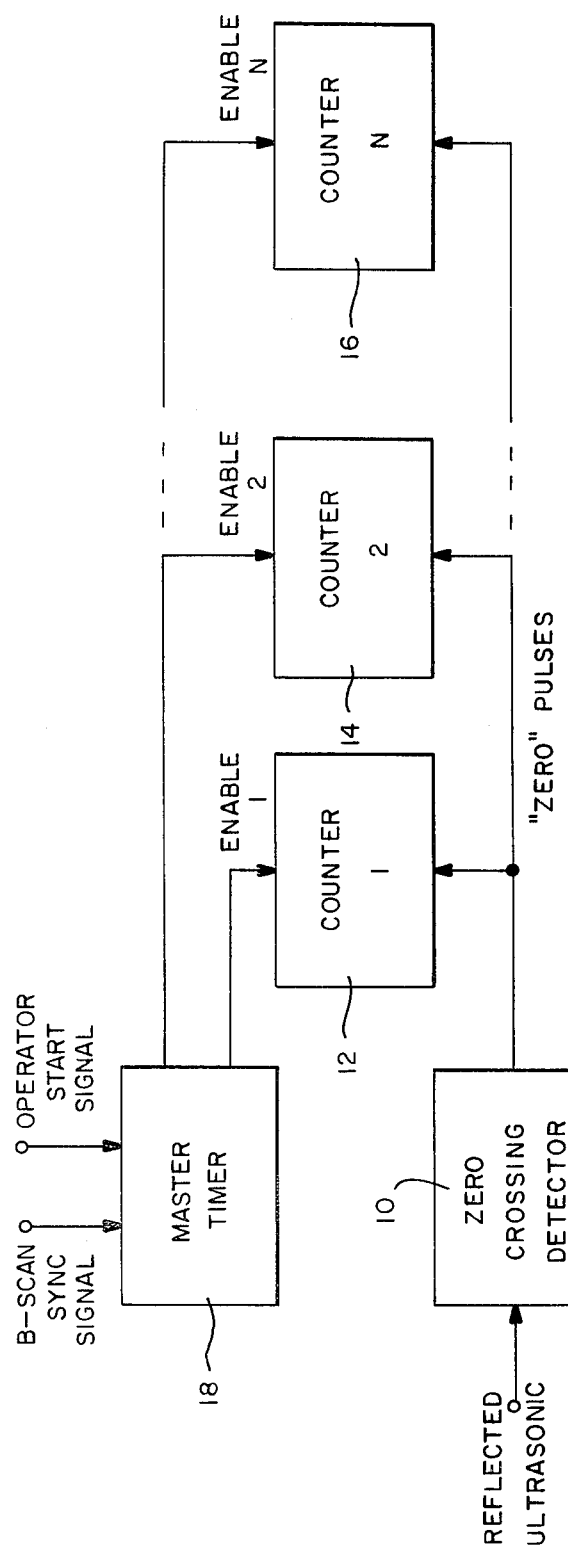
FIG.—1

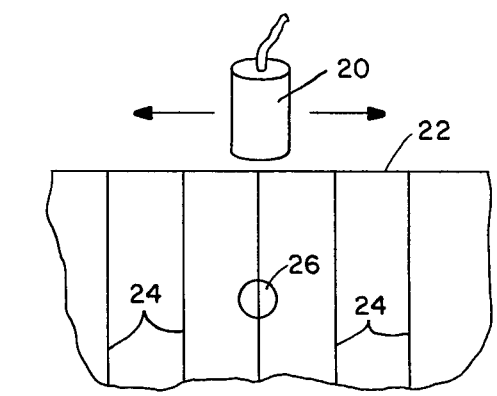
FIG.—2
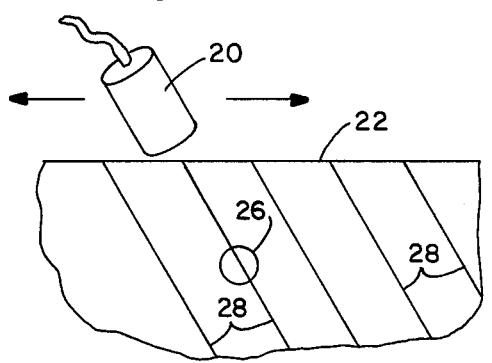
FIG.—3
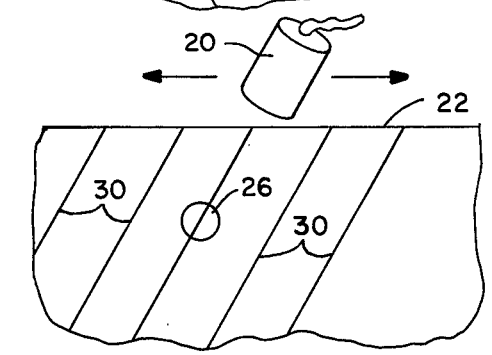
FIG.—4
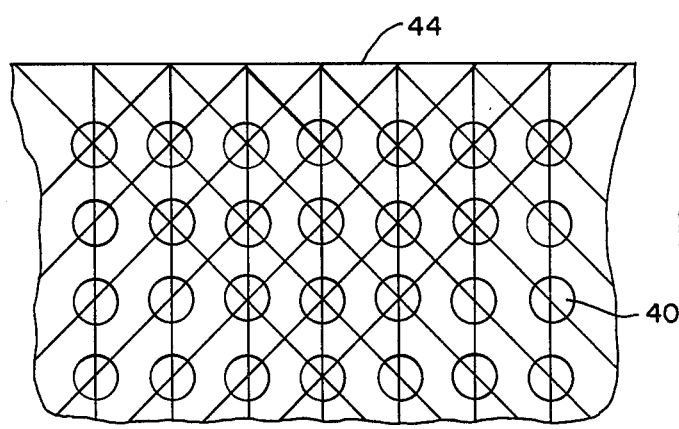
FIG.—5

METHOD OF DETERMINING ULTRASONIC ATTENUATION OF TISSUE USING REFLECTIVE TOMOGRAPHIC RECONSTRUCTION

This invention relates generally to ultrasonic scanning as used for medical diagnostic purposes, and more particularly the invention relates to methods of determining ultrasonic attenuation of tissue using ultrasonic reconstruction techniques.

Ultrasonic diagnostic systems are known and commercially available for medical diagnostic purposes. See for example U.S. Pat. No. 4,172,386 for "Video A Trace Display System for Ultrasonic Diagnostic System" and U.S. Pat. No. 4,204,433 for "Computerized Ultrasonic Scanner With Technique Select". The commercially available Datason ultrasound system of General Electric Company provides both real time and static images on a television display.

Briefly, such systems utilize sound transducers to transmit ultrasonic (e.g. on the order of several megahertz) waves into a patient and to receive reflected signals. The echo signals are applied to a time gain compensated amplifier to adjust the echo signals for attenuation in passing through the patient. The adjusted signals are then passed through an analog to digital conversion and video processing circuitry and thence to scan converter circuitry for display format.

Disclosed in co-pending patent application Ser. No. 369,423 filed Apr. 19, 1982, now U.S. Pat. No. 4,441,368, for Method and Means for Determining Ultrasonic Wave Attenuation in Tissue, is a method of determining frequency dependent attenuation at differing levels in tissue using a time domain analysis rather than a frequency domain analysis. More particularly, by counting the zero crossings of a reflected ultrasonic signal for different levels in tissue under examination and then comparing the zero crossing density at one level to the zero crossing density at a second level, the attenuation of the tissue between the two levels can be ascertained. The method and apparatus for determining zero crossing density is relatively simple and reliable.

As more particularly described in the application, the theoretical relationship of the attenuation coefficient of tissue to the zero crossing density of the returned ultrasonic signal is based on the theoretical relationships described by S. O. Rice in "Mathematical Analysis of Random Noise", Bell System Technical Journal 23, 24, Pages 1–162, 1944 and 1945 and Dines and Kak, "Ultrasonic Attenuation Tomography of Soft Tissues", *Ultrasonic Imaging*, Vol. 1, No. 1, Pages 16–33, 1979. According to the Dines and Kak paper if the spectrum of an ultrasonic pulse is Gaussian in shape then frequency selective attenuation will merely produce a downward translation of the spectrum with depth, leaving the spectral shape unchanged. This is shown in FIG. 4 as follows. Assuming a signal power spectrum of $$x(f) = a_o e^{-(f-f_o)^2/2\sigma^2} \quad (1)$$

and an attenuation term $$a(f) = e^{-\alpha_o f l} \quad (2)$$

where $a_o$ is an amplitude constant, $f$ = frequency, $f_o$ = center frequency of the spectrum, $\alpha_o$ the relative attenuation, and $l$ = the propagation path length. It should be noted that equation 2 makes the assumption the attenuation is linearly related to frequency. While this is true for tissue, the invention is not limited to linear dependence of frequency on attenuation. The resulting signal spectrum is the product of (1) and (2). Hence, $$S(f) = (f) \cdot x(f)$$
$$= a_o e^{-\alpha_o f l} e^{-(f-f_o)^2/2\sigma^2}$$
$$= a_o e^{-[f^2 - 2f f_o + 2\alpha_o \sigma^2 f l + f_o^2]/2\sigma^2}$$

The center of this spectrum can be found by finding the minimum of the term being exponentiated. Therefore, taking the derivative with respect to f and setting it equal to 0, one obtains $$d[f^2 - 2f f_o + 2\sigma^2 \alpha_o f l + f_o^2] = 2f - 2f_o + 2\sigma^2 \alpha_o l = 0$$

or $$f_{peak} = f_o - (\sigma^2 \alpha_o l)$$

it is seen that the peak of the Gaussian spectrum simply slides linearly toward lower frequencies as a function of $\alpha_o$ and $l$. Since the spectral shape is constant, a good estimate of $\alpha_o$ can be obtained simply by finding the center of the Gaussian shape, as follows:

$$\alpha_o = -\frac{1}{\sigma^2} \frac{\Delta f_c}{\Delta l}$$

Thus, by obtaining the change in frequency (or change in zero crossings) along a known propagation path (i.e. between two levels), the attenuation coefficient, $\alpha_o$, is obtained as a function of the transducer bandwidth parameter, $\sigma$.

It is known that a sampling of zero crossings along a single ultrasonic signal vector has a substantial variance. Heretofore, a plurality of readings have been obtained and averaged to minimize the variance. While estimated tissue attenuation for establishing time gain control can be improved by such averaging, the resolution does not improve image display.

The present invention is directed to obtaining and averaging a plurality of measurements of attenuation for a limited volume of tissue. In obtaining the plurality of measurements, ultrasonic waves are directed through the limited volume along a plurality of vectors, and the attenuation for the limited volume is calculated for each vector using the technique as described in application Ser. No. 369,370, supra, using a measure of frequency shift to determine attenuation. Establishing the total tissue attenuation based on a plurality of limited volumes using a plurality of vectors is similar to the tomograph reconstruction of a section of tissue.

Accordingly, an object of the invention is an improved method of determining ultrasonic attenuation of tissue under examination.

A feature of the invention is the use of a plurality of ultrasonic wave vectors intersecting a limited volume of tissue to obtain measures of attenuation of the limited volume.

The invention and objects and features thereof will be more readily apparent from the following detailed description and appended claims when taken with the drawing, in which:

FIG. 1 is a functional block diagram of apparatus for establishing ultrasonic attenuation in tissue based on zero crossings as a measure of frequency shift of a reflected wave.

FIGS. 2–4 are schematic illustrations of transducer means as used to obtain a plurality of vectors intersecting a limited volume of tissue in accordance with the invention.

FIG. 5 is a schematic illustrating the use of vectors for determining ultrasonic wave attenuation of tissue in accordance with the invention.

Referring now to the drawings, FIG. 1 is a functional block diagram of apparatus for establishing ultrasonic attenuation in tissue based on zero crossings as a measure of frequency shift of a reflected wave, as described in copending application Ser. No. 369,423 now U.S. Pat. No. 4,441,368, supra. A reflected ultrasonic signal from tissue under examination is applied to a zero crossing detector 10. The detector 10 preferably comprises a monostable multivibrator which is triggered by a Schmitt trigger whereby a pulse is generated in response to each zero crossing of the reflected signal. Such a Schmitt trigger and monostable multivibrator is commercially available, for example the Texas Instruments 74221 integrated circuit device. The output of the detector 10 is a series of pulses which are then connected to a plurality of counters such as counter 1, counter 2,—counter N. In a preferred embodiment each counter is a conventional pulse counter. Alternatively, each counter can comprise capacitive means for storing charge in response to the pulses.

A master timer 18 controls each of the counters whereby a count is accumulated for a specific interval of time corresponding to a depth in the tissue under examination. The master timer receives an operator start signal and a sync signal from the ultrasonic scanner, and enable signals are then generated for each of the counters based on the time of flight of an ultrasonic wave in the tissue under examination and the depth of the tissue from which zero crossings for reflected signals are to be counted. By comparing the count at one level to the count at another level the frequency dependent attenuation of an acoustic wave therebetween is established based on the equation given above and as described in copending application Ser. No. 369,423.

FIGS. 2–4 are schematics illustrating transducer means as used to obtain a plurality of vectors intersecting a limited volume of tissue in accordance with the invention. In FIG. 2 the transducer 20 is oriented perpendicular to the surface 22 of tissue under examination, and readings are obtained for a plurality of vectors 24 oriented perpendicular to the surface 22. As illustrated, one of the vectors intersects a limited area of tissue 26, and using the technique of application Ser. No. 369,423, supra, a measure of the ultrasonic attenuation of the limited volume 26 is obtained from an analysis of the zero crossings of a reflected ultrasonic wave.

In FIG. 3 the transducer 20 is oriented at an angle $\theta$ from the perpendicular, and again readings are obtained for a plurality of vectors 28 which are oriented at the angle $\theta$ with respect to the surface 22. One vector intersects the limited volume 26, and again a measure of the ultrasonic attenuation of the limited volume is obtained by analysis of the frequency shift of a reflected ultrasonic signal for the one vector.

In FIG. 4 the transducer 20 is tilted at angle $\phi$ to the perpendicular and readings for a plurality of vectors 30 are tilted at the angle $\phi$ with respect to the surface are obtained. Again, one vector intersects the limited volume 26, and a third measure of the attenuation of the limited volume 26 is obtained from an analysis of the reflected ultrasonic signal along this vector.

Three measures of the ultrasonic attenuation of the limited volume 26 have now been obtained, and an average of the three measures of attenuation provide a more accurate determination of the attenuation of the limited volume. It will be appreciated that additional readings can be obtained and averaged to further improve the accuracy of the determined attenuation of the limited volume.

FIG. 5 is a schematic illustration of use of the invention in obtaining the attenuation of the entire tissue by obtaining the attenuation of a plurality of limited volumes 40 as described above using sets of parallel vectors at different inclinations with respect to the surface 44 of the tissue. Such a reconstruction of the plurality of areas within the tissue is similar to the computed tomographic reconstruction of an area, which is well known in the art.

Ultrasonic attenuation of tissue determined in accordance with the invention is more accurate and increases the resolution of the displayed signals. While the invention has been described with reference to a specific embodiment, the description is illustrative of the invention and is not to be construed as limiting the invention. Various modifications and applications may occur to those skilled in the art without departing from the true spirit and scope of the invention as defined by the appended claims.

What is claimed is:

1. A method of determining ultrasonic wave attenuation of tissue comprising the steps of
    directing an ultrasonic wave along a first vector through a limited volume of tissue,
    detecting the frequency shift of a reflection of said ultrasonic wave along said first vector,
    determining a first measure of attenuation of said limited volume of tissue from said detected frequency shift along said first vector,
    directing an ultrasonic wave along at least a second vector through said limited volume of tissue,
    detecting the frequency shift of a reflection of said ultrasonic wave along said second vector,
    determining a second measure of attenuation of said limited volume of tissue from said frequency shift along said second vector, and
    averaging said first measure and said second measure.

2. The measure as defined by claim 1 wherein said steps of detecting the frequency shift include counting zero crossings of the reflected waves.

3. The method as defined by claim 1 or 2 and further including repeating all steps for a plurality of limited volumes of tissue.

* * * * *